(12) United States Patent
Bellinghausen et al.

(10) Patent No.: US 6,309,158 B1
(45) Date of Patent: Oct. 30, 2001

(54) ADJUSTABLE LENGTH CAPTIVE PANEL FASTENER

(75) Inventors: Carl P. Bellinghausen, Newton; Patrick M. Povilaitis, Oakridge, both of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/727,937

(22) Filed: Dec. 1, 2000

(51) Int. Cl.[7] .............................. F16B 21/18; F16B 39/00
(52) U.S. Cl. ..................... 411/353; 411/107; 411/535; 411/999
(58) Field of Search ................................. 411/107, 352, 411/353, 535, 536, 546, 999

(56) References Cited

U.S. PATENT DOCUMENTS

| | | | |
|---|---|---|---|
| 4,387,497 | * 6/1983 | Gulistan | 411/107 X |
| 4,396,327 | * 8/1983 | Menke | 411/107 X |
| 5,288,191 | * 2/1994 | Ruckert et al. | 411/535 X |
| 5,340,258 | * 8/1994 | Simon | 411/535 |

* cited by examiner

Primary Examiner—Neill Wilson
(74) Attorney, Agent, or Firm—David L. Davis

(57) ABSTRACT

A captive panel fastener has a telescopically adjustable two-part sleeve which provides a mechanism whereby the length of the fastener is selectively adjustable.

4 Claims, 1 Drawing Sheet

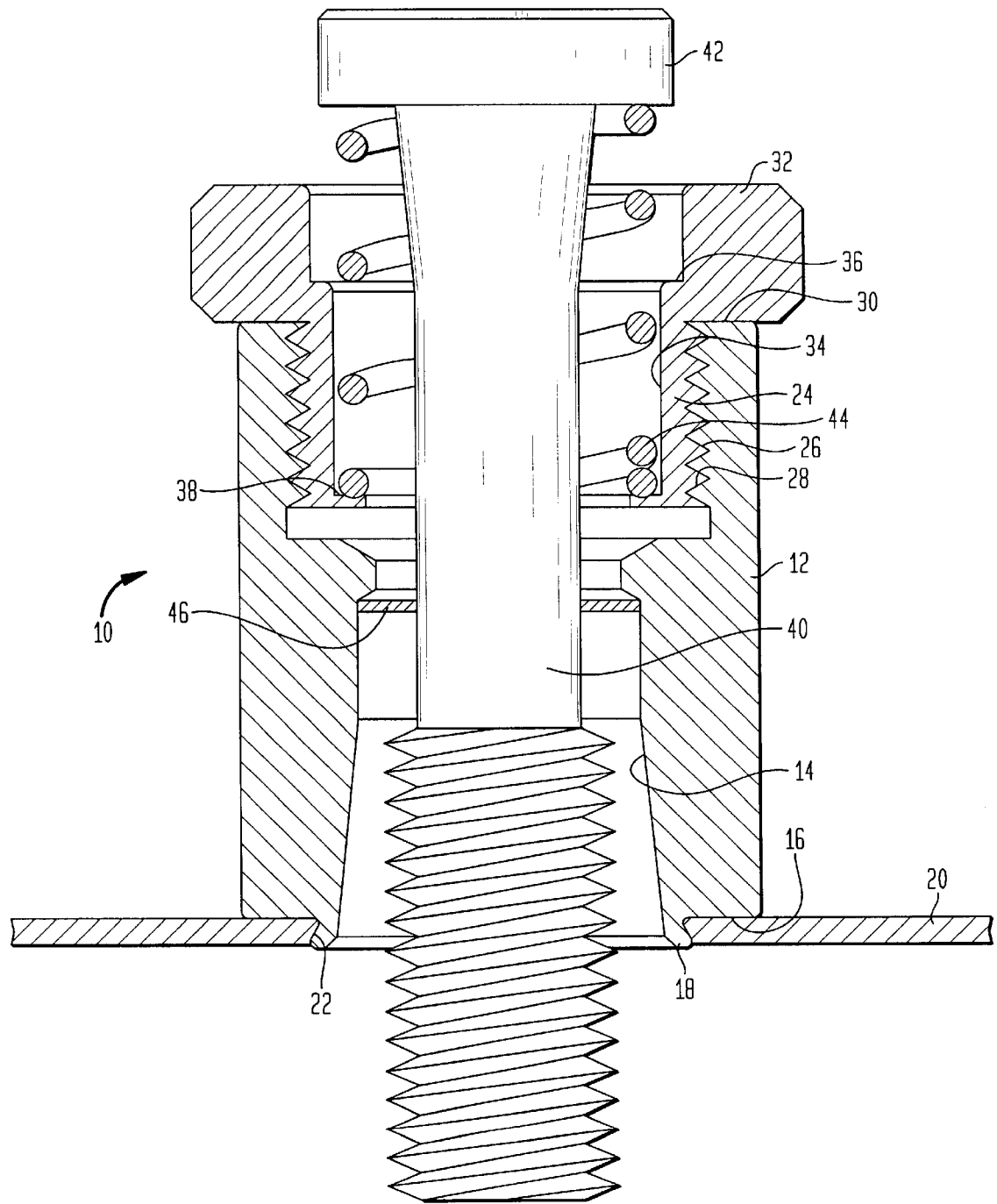

ADJUSTABLE LENGTH CAPTIVE PANEL FASTENER

BACKGROUND OF THE INVENTION

This invention relates to fasteners and, more particularly, to a fastener which is secured to a panel and is adapted to mount the panel to an underlying chassis.

Captive panel fasteners are used on a wide variety of products. Commercially available captive panel fasteners typically come in standard, pre-specified lengths which are dictated by the manufacturer and the demand for the product. Typically, the manufacturer stocks a number of fasteners which usually differ by length and thread code. This forces the manufacturer to stock many different types of fasteners, thereby increasing inventory costs. Also, when a non-standard length is required for a specific application, no product is available to address the application. It would therefore be desirable to have an adjustable length captive panel fastener.

SUMMARY OF THE INVENTION

According to the present invention, a captive panel fastener has a telescopically adjustable two-part sleeve which provides a mechanism whereby the length of the fastener is selectively adjustable.

According to an aspect of the present invention, there is provided an adjustable length captive panel fastener which comprises a cylindrical sleeve member having an internal axial through-bore. The sleeve member is formed with attachment structure at one end to secure the fastener to a panel. An adjustment member is axially movable within the sleeve member from the end opposite the one end, and has an internal axial through-bore which is stepped so as to provide first and second spaced ledges. A headed screw is adapted to extend through the internal through-bores of the sleeve member and the adjustment member so as to be rotatable and axially movable therein. The head of the screw is dimensioned so as not to pass the first ledge. A coil spring surrounds the screw within the through-bore of the adjustment member. A first end of the spring abuts the head of the screw and the second end of the spring abuts the second ledge.

In accordance with another aspect of this invention, the sleeve member is formed with internal threads in its through-bore and the adjustment member is formed with external threads adapted to mate with the internal threads of the sleeve member.

BRIEF DESCRIPTION OF THE DRAWINGS

The foregoing will be more readily apparent upon reading the following description in conjunction with the drawing in which the single FIGURE thereof is a cross-sectional view showing an adjustable length captive panel fastener constructed in accordance with the present invention.

DETAILED DESCRIPTION

Referring now to the drawing, the adjustable length captive panel fastener according to the present invention, designated generally by the reference numeral 10, includes a cylindrical sleeve member 12 which has an internal axial through-bore 14. At a first end 16, the sleeve member 12 is formed with attachment structure 18 for securing the fastener 10 to a panel 20. Illustratively, the attachment structure 18 is a radially outwardly directed flange surrounding the through-bore 14 at the first end 16 of the sleeve member 12. The flange 18 is adapted to extend through an aperture 22 in the panel 20 to secure the fastener 10 to the panel 20 by a press-fit operation with the through-bore 14 aligned with the aperture 22.

The fastener 10 also includes adjustment member 24 which is externally threaded at 26 to mate with complementary threads 28 in the through-bore 14 of the sleeve member 12. The threads 28 extend into the through-bore 14 from the second end 30 of the sleeve member 12 so that the adjustment member 24 is axially movable within the sleeve member 12. The adjustment member 24 has a radially outwardly directed flange 32 adapted to abut the end 30 of the sleeve member 12 so as to provide a limit for insertion of the adjustment member 24 into the through-bore 14 of the sleeve member 12. Thus, the sleeve member 12 and the adjustment member 24 are telescopically adjustable to selectively vary the length of the fastener 10.

The adjustment member 24 is formed with an internal axial through-bore 34 which is stepped so as to provide a first ledge 36 and a second ledge 38. A headed screw 40 extends through the through-bores 14 and 34. The head 42 of the screw 40 is sized so that it cannot pass the first ledge 36.

A coil spring 44 surrounds the screw 40 within the through-bore 34 of the adjustment member 24. A first end of the spring 44 abuts the head 42 of the screw 40 and the second end of the spring 44 abuts the second ledge 38. A retainer ring 46 captures the screw 40 so as to keep the assembly together.

In use, when the panel 20 is to be secured to an underlying chassis (not shown), the threaded end of the screw 40 is inserted into a suitable threaded bore in the chassis. The screw 40 is then rotated against the biasing force of the spring 44 until the head 42 bottoms out against the first ledge 36. If the threaded end of the screw 40 bottoms out in the threaded bore of the chassis before the head bottoms against the ledge 36, this indicates that the fastener 10 is too short. In this case, the adjustment member 24 is backed out of the sleeve member 12 a sufficient distance so that the screw head 42 bottoms out against the first ledge 36 before the threaded end of the screw 40 bottoms out in the threaded bore of the chassis.

Accordingly, there has been disclosed an improved adjustable length captive panel fastener. While an illustrative embodiment of the present invention has been disclosed herein, it will be appreciated by those of skill in the art that various adaptations and modifications to the disclosed embodiment are possible. It is therefore intended that this invention be limited only by the scope of the appended claims.

What is claimed is:

1. An adjustable length panel fastener, comprising:
   a cylindrical sleeve member having an internal axial through-bore, wherein the sleeve member is formed with attachment structure at one end to secure the fastener to a panel;
   an adjustment member axially movable within the sleeve member from the end opposite the one end, the adjustment member having an internal axial through-bore which is stepped so as to provide first and second spaced ledges;
   a headed screw adapted to extend through the internal through-bores of said sleeve member and said adjustment member so as to be rotatable and axially movable therein, and wherein the head of said screw is dimensioned so as not to pass said first ledge; and a coil spring adapted to surround said screw within the through-bore of said adjustment member, with a first end of said spring abutting the head of said screw and the second end of said spring abutting said second ledge.

2. The fastener according to claim 1 wherein:

said sleeve member is formed with internal threads in its through-bore; and said adjustment member is formed with external threads adapted to mate with the internal threads of the sleeve member.

3. The fastener according to claim 1 wherein the adjustment member includes a radially outwardly directed flange adapted to abut the opposite end of the sleeve member so as to provide a limit for insertion of the adjustment member into the through-bore of the sleeve member.

4. The fastener according to claim 1 wherein the attachment structure includes a radially outwardly directed flange surrounding the through-bore at the one end of the sleeve member, wherein the flange is adapted to extend through an aperture in the panel and to secure the fastener to the panel by a press fit operation with the through-bore aligned with the aperture.

* * * * *